United States Patent [19]

Franzen

[11] 4,215,411

[45] Jul. 29, 1980

[54] METHOD AND APPARATUS FOR THE COMPARATIVE DETERMINATION OF AN UNKNOWN MASS

[75] Inventor: Jochen Franzen, Wildeshausen, Fed. Rep. of Germany

[73] Assignee: Varian Mat GmbH, Bremen, Fed. Rep. of Germany

[21] Appl. No.: 933,921

[22] Filed: Aug. 15, 1978

[30] Foreign Application Priority Data

Aug. 18, 1977 [DE] Fed. Rep. of Germany ....... 2737199

[51] Int. Cl.[2] ...................... G06F 15/52; B01D 59/44; H01J 39/50

[52] U.S. Cl. .................................... 364/527; 250/282; 364/498; 364/567

[58] Field of Search ....................... 364/498, 527, 567; 250/281, 282

[56] References Cited

U.S. PATENT DOCUMENTS

| | | | |
|---|---|---|---|
| 3,920,986 | 11/1975 | Fies, Jr. | 250/282 |
| 4,008,388 | 2/1977 | McLafferty et al. | 364/498 |
| 4,066,894 | 1/1978 | Hunt et al. | 250/282 X |

*Primary Examiner*—Jerry Smith

*Attorney, Agent, or Firm*—Sughrue, Rothwell, Mion, Zinn and Macpeak

[57] ABSTRACT

Ions from an unknown and two known masses are fed through a quadrupole mass filter to an electron multiplier detector whose digitally converted output is supplied to a data processing device. The latter controls the alternating and DC signals fed to the paired electrode rods of the filter. The data processing device performs transformations on the mass characteristic curves derived from the ions to equalize their widths, heights and shapes, and then determines the distance between the normalized curves using a voltage shifting technique to superimpose the curves one on another. The unknown mass may then be accurately determined from the separation distances.

5 Claims, 2 Drawing Figures

METHOD AND APPARATUS FOR THE COMPARATIVE DETERMINATION OF AN UNKNOWN MASS

BACKGROUND OF THE INVENTION

This invention relates to a method and apparatus for precisely determining the mass of a substance by performing a mass comparison between ions of at least two known masses and ions of the unknown substance.

SUMMARY OF THE INVENTION

The basic purpose of the invention is to provide a way in which a mass comparison between ions of at least two known masses and ions of the unknown substance can be performed in a relatively simple manner to obtain a precise mass determination, even when the mass curves involved have different widths, heights and/or shapes.

Briefly, and in accordance with the present invention, ions from an unknown and two known masses are fed through a quadrupole mass filter to an electron multiplier detector whose digitally converted output is supplied to a data processing device. The latter controls the alternating and DC signals fed to the paired electrode rods of the filter. The data processing device performs transformations on the mass characteristic curves derived from the ions to equalize their widths, heights and shape, and then determines the distances between the normalized curves using a voltage shifting technique to superimpose the curves one on another. The unknown mass may then be accurately determined from the separation distances.

DETAILED DESCRIPTION OF THE PREFERRED EMBODIMENT

Figure 1:
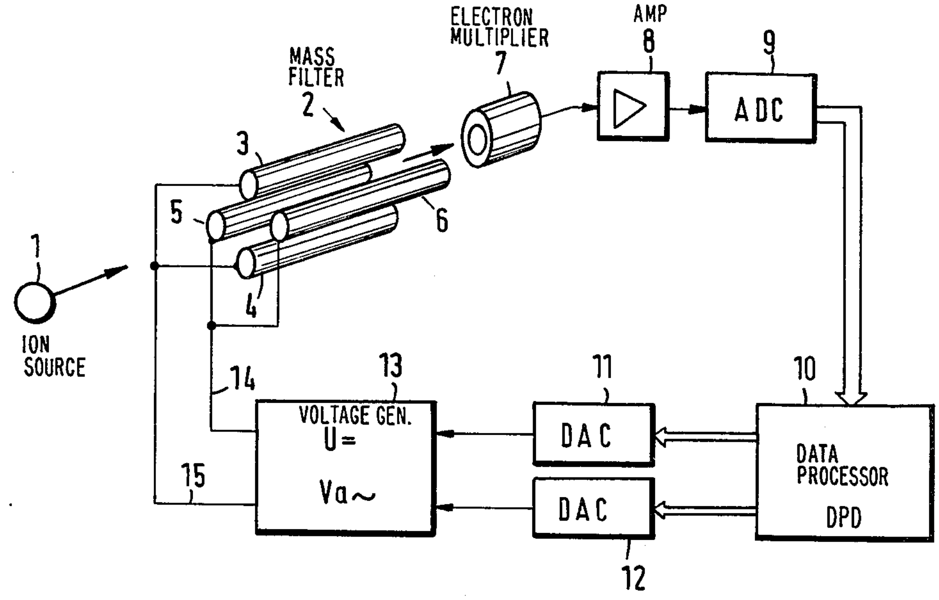
FIG. 1 shows a simplified schematic block diagram of an apparatus for making a comparative determination of an unknown mass in accordance with the present invention.

FIG. 1 shows an apparatus having an ion source 1, which is capable of emitting ions of at least two known masses as well as ions of an unknown mass. The ions emitted from the source 1 arrive at a quadrupole mass filter 2, which in the present case may have four round rods 3, 4, 5, 6. The diametrically opposite rods 3, 4 and 5, 6 are connected together to form electrodes.

A secondary electron multiplier 7 is disposed on the output side of the filter, and provides an electrical signal at its output in response to ions supplied from the filter 2. This signal is fed to the input of a DC amplifier 8 which implements an impedance conversion. The amplifier output controls an analog-digital converter (ADC)9. The ADC samples the amplifier signal several times, and converts it to a corresponding set of digital signals. The signal supplied to the input of the ADC9 is preferably detected or sampled at least eight times. The output signals from the ADC correspond to the mass curves of the known masses and the mass to be determined, the ions of which are emitted from the source 1.

A data processing device (DPD) 10 receives the digital output signals of the ADC, and its output in turn controls first and second digital-analog converters (DAC) 11, 12. The digital signals fed from the DPD to the first DAC 11 determine the ratio of a direct voltage U= supplied to the filter 2 to an alternating voltage Va∼ which is also supplied to the filter. The DAC 11 provides analog signals which correspond to its own input to control a voltage generator 13, which is connected to the rods 5, 6 by an output line 14 and to the rods 3, 4 by an output line 15. The other DAC 12 receives control signals from the data processing device 10 which determine the amplitude of the alternating voltage supplied to the filter 2 by the voltage generator 13.

The above apparatus can be utilized to perform a mass comparison using a magnetic field arrangement, and employs two known masses therefor. Preferably one known mass is lighter than the mass to be determined and the other known mass is heavier.

Figure 2:
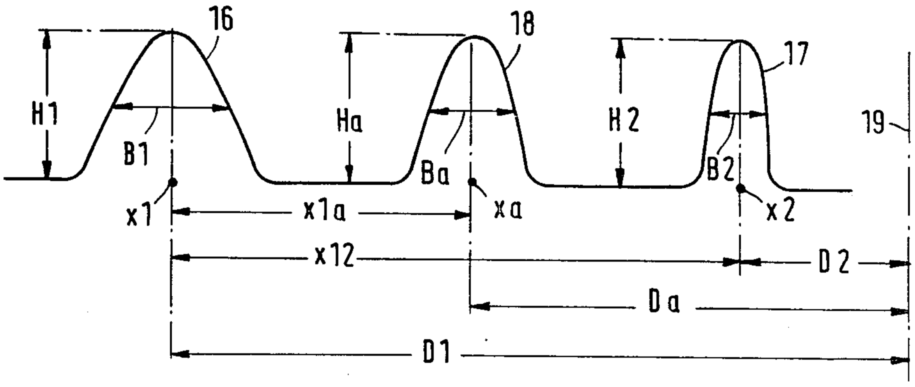
FIG. 2 shows a plot of characteristic curves derived from the ions of an unknown and two known masses.

The process will now be described with reference to FIG. 2, which shows three mass curves 16, 17 and 18. The two curves 16 and 17 correspond to known masses m1 and m2, respectively, the mass m2 being larger than the mass m1. The curve 18 corresponds to a mass ma to be determined, and lies between the two curves 16, 17 of the known masses m1 and m2. The curves shown in FIG. 2 are obtained from the apparatus shown in FIG. 1 since at a given ratio of the direct voltage U= supplied to the filter 2 and the alternating voltage Va∼, the latter is changed in a step-like manner, and in the same cycle in which this change takes place a corresponding detection of the signals from the electron multiplier 7 takes place in the analog-digital converter 9. As already mentioned above, each mass signal is detected at least eight times. By changing the value of the alternating voltage Va∼ accordingly, the "transmission window" of the quadrupole filter 2 is shifted in such a manner that the mass curves 16, 17, 18 shown in FIG. 2 are successively obtained. The distances between these curves are thus determined by amplitude differences between the alternating voltages respectively supplied to the filter 2. Because these voltages are decreased by resistance decades, the mass curve separations are determined by corresponding different settings of the resistance decades.

In order to carry out a mass comparison procedure with the thus-obtained mass curves by changing the alternating voltage Va∼ supplied respectively to the quadrupole mass filter 2, the mass curves must be brought into coincidence to overlie one another. This requires, however, that the curves all have the same shape. Departing from the relationships actually shown in FIG. 2, it will thus be assumed in the following discussion that all three mass curves 16, 17, 18 have the same shape.

By changing the amplitude of the alternating voltage Va∼ supplied to the filter 2, the mass curve 17 of the known mass m2 must first be brought into coincidence with the mass curve 16 of the known mass m1. This corresponds to a shifting of the curve 17 by a distance of x12 toward the curve 16. Thereafter the curve 18 of the unknown mass ma is shifted by changing the alternating voltage Va∼ in such a manner that curve 18 coincides with curve 16, which together with curve 17 is taken as a reference curve. The shifting of the curve 18 toward the curve 16 corresponds to a distance of x1a. Once the shift distances are determined, the mass ma can be calculated from the known masses m1 and m2 from the following equation:

$$ma = m1 + (x1a/x12)(m2 - m1).$$

The shift distances correspond to electrical control signals by means of which the amplitude of the alternating voltage Va∼ supplied to the filter 2 is changed so that the otherwise spaced mass curves are superimposed over each other. The mass m1 in the equation represents the smaller of the two known masses. By means of this double over-lapping of the mass curves, the shifting voltages which are always present in the device and which effect each measuring procedure are eliminated. Because these shifting or offset voltages are overlapped onto the alternating voltage supplied respectively at equal values to the quadrupole mass filter 2 according to FIG. 1, and because the second overlapping of the curve 18 with the curve 16 is mathematically a subtraction from the first overlapping of curve 17 with curve 16, the shifting voltages which are effective during both overlapping processes are cancelled. This increases the precision of the determination of the mass ma.

The above process requires that the mass curves which are brought into coincidence with each other have the same profile. In practice this is not always guaranteed, and often a change in a mass curve will be observed. In this case, before the overlapping process, one must first proceed to give the curves 16, 17 of the known masses a profile by means of weighing which corresponds to that of the curve 18 of the unknown mass. The approximately distances between the mass curves are used thereby as weighting factors. The mass curve 16 is weighted in this case with a factor g1, which means that all points of the curve are multiplied by this factor. The weight factor g1 satisfies the equation:

$$g1 = (x'a2/x'12),$$

whereby x'a2 is the approximate distance between the curves 17 and 18, and x'12 is the distance between the curves 16 and 17. The curve 17 of the known mass m2 is weighted in a corresponding manner with a factor g2, which satisfies the equation:

$$g2 = x'1a/x'12,$$

whereby x'1a is the approximate distance between the curves 16 and 18. The sum of the two weighting factors g1 and g2 equals 1. In this weighting of the mass curve profiles it is also required that the following distance equation holds true:

$$x'a2 = x'12 - x'1a.$$

If this weighting of the mass curves 16 and 17 in the data processing device 10 takes place by a corresponding multiplication of their profiles by the weighting factors, then the mass curves can be brought into coincidence with each other in the abovedescribed manner whereby the value of the unknown mass ma can be determined according to the above equation because the distances x12 and x1a can now be precisely determined as a result of the uniformity of the curve shapes.

A certain return control is also provided by the data processing device 10, which enables successive alternating voltages to be supplied to the quadrupole mass filter 2 in such a manner that the respective mass curves arrive in coincidence with each other. However, it is also possible to operate without such a return control whereby the measurement signals received in the data processing device 10 are directly evaluated therein. Such measures may be used in cases where the return control does not guarantee the desired shape uniformity of the mass curves which are to be brought into coincidence with each other. One can thus proceed from the fact that the width of the individual mass curves changes linearly with mass. In order to demonstrate the associated relationships, refer to FIG. 2, wherein B1 is the width of the mass curve 16 at half of its elevation H1, B2 is the width of the mass curve 17 at half of its elevation H2, and Ba is the width of the mass curve 18 at half of its elevation Ha. A linear dependence of the width of the mass curves is thus given when the following equation is satisfied:

$$\frac{B1 - Ba}{x1a} = \frac{B1 - B2}{x12}.$$

It has been demonstrated that a width rectification of the mass curves, in which the presently described linear dependence exists between the width and the mass, can be undertaken according to the following equation:

$$w = f(x) = c \cdot \ln(x - xo),$$

whereby c is a constant chosen such that the mass curve 18 maintains its width, x1 designates the location of one of the mass curves (16) of known mass, x2 designates the location of the other mass curve (17) of known mass, and xa designates the location of the mass curve (18), and where the value of xo satisfies the equation:

$$xo = \frac{B1 \cdot B2}{B1 - B2}\left(\frac{x1}{B1} - \frac{x2}{B2}\right).$$

A change of the distance of the concerned mass curves according to the equation given for w is connected with this transformation of mass curves to the same width. The previously mentioned locations x1, xa and x2 result from the distances D1 or Da or D2 from a line 19 for the width rectifications, which line is to be viewed as a zero point line. The line 19 thereby establishes the location at which a mass curve possesses a width of zero. Accordingly, the locations x1, xa and x2 are given by the following equations:

$$\frac{B1}{D1} = \frac{Ba}{Da} = \frac{B2}{D2}.$$

Because the location x1 is given by the distance D1, the location xa is given by the distance Da, and the location x2 is given by the distance D2, then:

$$x1 = \frac{x1a}{1 - \frac{B1}{Ba}},$$

and also:

$$xa = \frac{x12 - x1a}{1 - \frac{Ba}{B2}} = \frac{x1a}{\frac{Ba}{B1} - 1}, \text{ and}$$

$$X2 = \frac{x12 - x1a}{\frac{B2}{Ba} - 1}.$$

If the mass curve available to the data processing device 10 have been transformed in the above manner to mass curves to equal width while simultaneously changing the respective spacing distances of the curves, then mass curves are available to the data processing device 10 which can be evaluated using the above equations to determine the mass ma.

If the mass signals to be evaluated in the data processing device 10 according to the equation given above for ma have different heights in addition to different widths, then an equalizing height transformation is also necessary according to the following equations:

$$S1\ (i1) = \frac{Ha}{H1} \cdot i1$$

$$S2\ (i2) = \frac{Ha}{H2} \cdot i2.$$

S1 and S2 are corresponding points on the transformed nominal value curve, which is obtained from the actual value curves 16 or 17 with the actual valves i1 or i2.

In the above explanation concerning the transformations of the mass curves into curves of equal width and height, it was assumed that the curves all have a similar shape. If the shapes of the curves are different, however, then an additional transformation of the shapes can be undertaken in a manner corresponding to that mentioned above in conjunction with the return control in the apparatus shown in FIG. 1.

Perfluorkerosen may be utilized as a suitable reference substance for representing mass curves of known masses, and the ion source 1 in FIG. 1 may be a switchable ion source which can emit either positive ions or negative ions. One must be sure, however, that the bombardment conditions or requirements for the ions in the quadrupole mass filter 2 always remain the same.

What is claimed is:

1. Apparatus for accurately determining the mass of an unknown substance, the apparatus including an ion source for emitting ions of at least two known masses with one mass being larger than the other mass and ions of the unknown substance comprising; said ion source providing an input to a quadrapole mass filter, detector means positioned on the output side of the quadrapole mass filter for producing a control signal in accordance with ions of differing masses for controlling the production of a DC voltage and an AC voltage coupled to the quadrapole mass filter, an arithmetic unit of a data processing device (10) coupled to the output of the detector means, the arithmetic unit first producing an electrical signal representing the difference between a signal representing one of the larger known masses (m2) and a signal representing one of the smaller known masses (m1) and multiplying the difference signal (m2–m1) thus produced by q quotient signal (x1a/x12) of which the dividend signal (x1a) is formed by an electrical signal corresponding to the distance between a mass line (18) of the unknown mass (ma) and the mass line of the known mass (m1) and of which the divisor signal (x12) is formed by an electrical signal corresponding to the distance between the mass line (16) of the smaller known mass (m1) and the mass line (17) of the larger known mass (m2), the arithmetic unit adding the thus-formed product signal to the electrical signal corresponding to the smaller known mass (m1) to form a sum signal which represents the size of the unknown mass (ma), and voltage generating means receiving control signals from said data processing device and generating a feedback voltage to said quadrapole mass filter to shift the transmission range thereof for obtaining said mass lines.

2. An apparatus according to claim 1, further comprising a pair of digital-analog converters, to successively shift and superimpose the two known mass curves to form a reference mass curve, and then shift the unknown mass curve into superimposition over the reference mass curve.

3. An apparatus according to claim 2, wherein one of the digital-analog converters determines the ratio of the direct voltage U= supplied to the quadrupole mass filter to the alternating voltage Va∼ supplied thereto, and the other digital-analog converter controls the amplitude of the alternating voltage Va∼.

4. An apparatus according to claim 3, wherein said detector means comprises a secondary electron multiplier and an analog-digital converter which detects each output signal of the secondary electron multiplier a plurality of times.

5. An apparatus according to claim 4, wherein the ion source may be switched to emit either positive or negative ions.

* * * * *